US012654280B2

(12) United States Patent
Chiou

(10) Patent No.: US 12,654,280 B2
(45) Date of Patent: *Jun. 16, 2026

(54) CMP PAD HAVING POLISHING LAYER OF LOW SPECIFIC GRAVITY

(71) Applicant: Rohm and Haas Electronic Materials CMP Holdings, Inc., Newark, DE (US)

(72) Inventor: Nan-Rong Chiou, Wilmington, DE (US)

(73) Assignee: DuPont Electronic Materials Holding, Inc., Newark, DE (US)

( * ) Notice: Subject to any disclaimer, the term of this patent is extended or adjusted under 35 U.S.C. 154(b) by 875 days.

This patent is subject to a terminal disclaimer.

(21) Appl. No.: 17/805,044

(22) Filed: Jun. 2, 2022

(65) Prior Publication Data

US 2023/0390889 A1      Dec. 7, 2023

(51) Int. Cl.

| | |
|---|---|
| *B24B 37/22* | (2012.01) |
| *B24B 37/24* | (2012.01) |
| *B24D 3/28* | (2006.01) |
| *B24D 18/00* | (2006.01) |
| *C08G 18/32* | (2006.01) |
| *C08G 18/38* | (2006.01) |
| *C08G 18/40* | (2006.01) |
| *C08L 75/04* | (2006.01) |

(52) U.S. Cl.
CPC .............. *B24B 37/24* (2013.01); *B24B 37/22* (2013.01); *C08L 75/04* (2013.01)

(58) Field of Classification Search
None
See application file for complete search history.

(56) References Cited

U.S. PATENT DOCUMENTS

| | | | |
|---|---|---|---|
| 5,578,362 A | 11/1996 | Reinhardt et al. | |
| 5,811,506 A | 9/1998 | Slagel | |
| 7,445,847 B2 | 11/2008 | Kulp | |
| 9,586,304 B2 | 3/2017 | Qian et al. | |
| 10,391,606 B2 | 8/2019 | Weis et al. | |
| 2006/0089095 A1* | 4/2006 | Swisher | B24B 37/205 |
| | | | 451/533 |
| 2009/0094900 A1 | 4/2009 | Swisher | |
| 2009/0137120 A1* | 5/2009 | Huang | B24D 11/00 |
| | | | 438/692 |
| 2014/0120809 A1* | 5/2014 | Qian | B24B 37/24 |
| | | | 451/527 |
| 2015/0065014 A1* | 3/2015 | Jensen | B24B 1/00 |
| | | | 451/41 |
| 2015/0273652 A1* | 10/2015 | Qian | B24B 37/205 |
| | | | 451/529 |
| 2016/0176022 A1* | 6/2016 | Qian | B24D 3/32 |
| | | | 51/296 |
| 2018/0281149 A1* | 10/2018 | Qian | B24B 37/24 |
| 2018/0345448 A1* | 12/2018 | Weis | B24B 37/042 |
| 2018/0345449 A1* | 12/2018 | Weis | H01L 21/3212 |
| 2019/0061097 A1 | 2/2019 | Seo | |
| 2019/0168356 A1 | 6/2019 | Qian | |
| 2020/0215661 A1* | 7/2020 | Zhu | H01L 21/30625 |
| 2021/0122007 A1 | 4/2021 | Yun et al. | |
| 2023/0390889 A1 | 12/2023 | Chiou | |

OTHER PUBLICATIONS

Copending U.S. Appl. No. 17/805,040.
Copending U.S. Appl. No. 17/805,037.

* cited by examiner

*Primary Examiner* — Melissa A Rioja
(74) *Attorney, Agent, or Firm* — Blake T. Biederman

(57) ABSTRACT

A polishing pad for chemical mechanical polishing comprises: a polishing layer that comprises a polymer matrix that is the reaction product of an isocyanate terminated oligomer or polymer with a curative blend comprising a mono-aromatic polyamine curative and a polyamine curative having two or more aromatic rings, wherein the polymer matrix has hard segment domains and soft segment domains wherein pores are present in the polymer matrix, such pores being formed by expansion of pre-expanded fluid filled polymeric microspheres such expansion occurring during reaction of the isocyanate terminated oligomer or polymer with the mono-aryl amine curative and the poly-aryl amine curative, wherein the pores have a unimodal size distribution and wherein the polishing layer has a specific gravity of less than 0.70 $g/cm^3$.

8 Claims, 3 Drawing Sheets

CMP PAD HAVING POLISHING LAYER OF LOW SPECIFIC GRAVITY

FIELD

This application relates to polishing pads useful for polishing and planarizing substrates, such as semiconductor substrates or magnetic disks.

BACKGROUND

Chemical Mechanical Planarization (CMP) is a polishing process that is used to flatten, or planarize, the layers of construction of an integrated circuit to precisely build multilayer three-dimensional circuitry. The layer to be polished is often a thin film (e.g., less than 10,000 Angstroms) that has been deposited on an underlying substrate. The objectives of CMP are to remove excess material on the wafer surface to produce an extremely flat layer of a uniform thickness, said uniformity extending across the entire wafer area. Control of removal rate and the uniformity of removal are of paramount importance.

CMP uses a polishing pad and a polishing fluid (e.g., slurry) to polish a substrate (e.g., a wafer). The fluid or slurry typically contains nano-sized particles. The polishing pad can be mounted on a rotating platen. The substrate (e.g., wafer) can be mounted into a separate fixture, or carrier, which can have a separate means of rotation. The polishing pad and substrate are pressed against each other under a controlled load with high rate of relative motion (i.e., high rate of shear). The slurry is provided between the polishing pad and the substrate. This shear and any slurry particles trapped at the pad/wafer junction abrade the substrate surface, leading to removal of material from the substrate.

The polishing pad can comprise multiple layers; (a) an upper layer that contacts the wafer to provide the polishing action (i.e., a polishing layer), (b) one or more sub-layers of greater compressibility incorporated to adjust pad-wafer compliance, and (c) optionally, adhesive layers used to join (a) and (b) as well as for affixing the entire pad to the rotating platen. The upper polishing layer is of critical importance to the success of the CMP process.

The polishing layer in many CMP pads comprise closed cell polyurethanes formed by reacting polyols with isocyanates to form an isocyanate terminated pre-polymer, followed by mixing with a curative and polymeric microelements that leads to reaction to form the polishing layer. See, e.g., U.S. Pat. Nos. 5,578,362, and 10,391,606. U.S. Pat. No. 9,586,304 discloses that a mixture of pre-expanded and un-expanded fluid-filled polymeric microspheres improves uniformity of the polymeric microsphere distribution and can provide pads with relatively low specific gravity and density. However, the use of pre-expanded and un-expanded fluid-filled polymeric microspheres can lead to a bi-modal distribution of pores in the final pad (e.g., where the unexpanded fluid-filled polymeric microspheres expand to a different size than the pre-expanded fluid-filled polymeric microspheres).

It would be desirable to be able to consistently and efficiently produce polishing layers having low degrees of variability of properties, including one or more of pore size distribution and specific gravity. It would also be desirable to have a polishing pad having a polishing layer with a low specific gravity and a unimodal pore size distribution.

SUMMARY OF THE INVENTION

Disclosed herein is a polishing pad for chemical mechanical polishing comprising: a polishing layer that comprises a polymer matrix that is the reaction product of an isocyanate terminated oligomer or polymer, with a curative blend comprising a mono-aromatic polyamine curative and a polyamine curative having two or more aromatic rings, wherein the polymer matrix has hard segment domains and soft segment domains wherein pores are present in the polymer matrix, such pores being formed by expansion of pre-expanded fluid filled polymeric microspheres such expansion occurring during reaction of the isocyanate terminated oligomer or polymer with the mono-aryl amine curative and the poly-aryl amine curative, wherein the pores have a unimodal size distribution and wherein the polishing layer has a specific gravity of less than 0.70 g/cm3.

DETAILED DESCRIPTION OF THE INVENTION

Figure 1A:
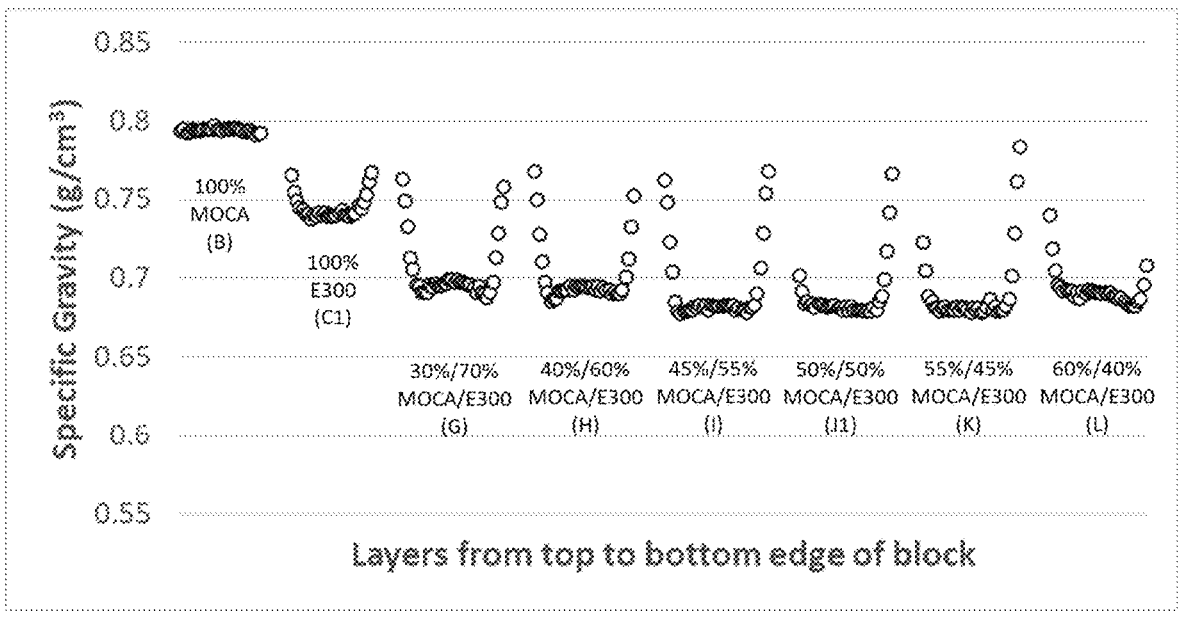
FIGS. 1a and 1b are graphs showing specific gravity of polishing layers in a series of polishing layers cut from a cured cast block for various formulations.

The present inventors discovered a method that enables efficient manufacture of polishing pads comprising polishing layers having consistent properties, such as one or more of specific gravity and pore size distribution. Moreover, the method enables formation of polishing layers with relatively low specific gravity and/or unimodal pore size distribution. The method involves reacting a specific blend of curatives with a pre-polymer in the presence of pre-expanded polymeric microspheres. The pre-polymer and curatives react to form a polymer matrix. The blend of curatives facilitates further ultra-expansion of the polymeric microspheres to yield surprisingly low specific gravity. The method comprises casting a mixture of the pre-polymer, pre-expanded polymeric microspheres and curative blend into a mold, curing the composition in the mold to form a porous polymeric block, and cutting the porous polymeric block into a series of polishing layers. The series of polishing layers can be characterized in that a portion of the series polishing layers cut from the center portion of the block have a specific gravity that is lower than a specific gravity of a polishing layer cut from the edge of a block by greater than 5%. In addition, or alternatively, the series of polishing layers can be characterized in that a portion of the series has a specific gravity that vary by less than 0.03, less than 0.02, or less than 0.01 g/cm3. Alternatively, or in addition, the series of polishing layers can be characterized in that a portion of the series has a specific gravity that vary by less than 3%.

As used herein, specific gravity is the ratio of weight to volume of the sample.

The polishing pads disclosed herein have a polishing layer formed by reacting an isocyanate terminated pre-polymer with a blend of curatives in the presence of pre-expanded polymeric microspheres. The blend of curatives comprises one or more mono-aromatic polyamines and one or more polyamines having two or more aromatic rings. The polishing pad can be characterized by one or more of the following: unimodal size distribution and wherein the polishing layer has a specific gravity of less than 0.70 g/cm3; shear loss modulus (G") at 104° C. to shear loss modulus (G") at 150° C. of at least 5; a specific gravity of the polishing layer is less than or equal to 95% of a calculated specific gravity for the isocyanate terminated oligomer or polymer, the curative blend and the pre-expanded fluid filled polymeric microspheres.

Without wishing to be bound by theory, it is believed that the exotherm generated by reaction of the curative system with isocyanate terminated prepolymer may assist in further expansion of the polymeric microspheres, while the presence of the blend of curatives may delay the setting of the polymer as indicated by greater shear loss modulus drop at higher temperature, which setting would effectively prevent further expansion of the polymeric microspheres while still becoming substantially stiff to avoid collapse or rupture of the pores formed by further expansion of the polymeric microspheres. In this method the desired low specific gravity, unimodal pore-size distribution, or both can be obtained without the inclusion of unexpanded polymeric microspheres in the formulation.

The present inventors found that polishing layers having a ratio of shear loss modulus (G") as measured by Dynamic Mechanical Analysis (for example according to ASTM D5279-08 (2008)) at or slightly above cure temperature (e.g., 104° C.) to the shear loss modulus G" at 150° C. of greater than 5:1, greater than 5.5:1, greater than 7:1, greater than 9:1, greater than 10:1, greater than 12:1, or greater than 15:1, can have ultra-expanded polymeric microspheres as indicated by a lower specific gravity in the final pad. The ratio of shear loss modulus (G") as measured by Dynamic Mechanical Analysis (for example according to ASTM D5279-08 (2008)) at or slightly above cure temperature (e.g., 104° C.) to the shear loss modulus G" at 150° C. also can be, for example, less than 30:1 or less than 25:1. In addition to elastic properties, these polishing layers have viscous properties that allow greater expansion of the microspheres during casting and dampen the polishing pad during polishing.

The pads disclosed herein can have an actual specific gravity of the polishing layer that is less than 97%, less than 96%, less than 95%, less than 94%, less than 93%, less than 92%, less than 91%, or less than 90% of the calculated average specific gravity for the polishing layer. The actual specific gravity of the polishing layer also can be at the same time, for example, at least 50%, at least 60%, at least 70%, or at least 75% of the calculated specific gravity for the polishing layer. The actual specific gravity can be determined by weighing and determining volume of the sample and dividing the weight of the sample by the volume. The calculated specific gravity is the (total weight of pre-polymer plus curative(s) plus pre-expanded polymeric microspheres) divided by the sum of (prepolymer weight÷prepolymer specific gravity) plus (weight of polymeric microspheres÷specific gravity of the pre-expanded polymeric microspheres) plus, for each curative, (weight of that curative÷specific gravity of that curative). While some further expansion occurs for most systems, the curative blend disclosed herein yields more expansion relative to a single curative system leading to ultra-expanded polymeric microspheres.

The pre-polymer includes at least two isocyanate groups for reaction with the curative. In other words, each prepolymer has at least two isocyanate end groups. The isocyanate groups can be terminal groups on the pre-polymer. For example, if the pre-polymer is a linear pre-polymer without branching or isocyanate pendant groups there can be two terminal isocyanate end groups.

The prepolymer system can comprise one prepolymer or mixtures of two or more prepolymers. The weight percent unreacted isocyanate group (NCO) range can be adjusted by the blends of the prepolymers and the prepolymer polyols thereof. The prepolymer system can, optionally, comprise lower molecular weight species, e.g., monomers, dimers, etc.

The pre-polymer can be formed from a polyfunctional aromatic isocyanate (e.g. an aromatic polyisocyanate) and a prepolymer polyol.

For purposes of this specification, the term prepolymer polyol includes diols, polyols, polyol-diols, copolymers thereof and mixtures thereof. Examples of prepolymer polyols include polyether polyols, such as, poly(oxytetramethylene)glycol, poly(oxypropylene)glycol and mixtures thereof, polycarbonate polyols, polyester polyols, polycaprolactone polyols and mixtures thereof. The preceding polyols can be mixed with low molecular weight polyols, such as ethylene glycol, 1,2-propylene glycol, 1,3-propylene glycol, 1,2-butanediol, 1,3-butanediol, 2-methyl-1,3-propanediol, 1,4-butanediol, neopentyl glycol, 1,5-pentanediol, 3-methyl-1,5-pentanediol, 1,6-hexanediol, diethylene glycol, dipropylene glycol, tripropylene glycol and mixtures thereof. The prepolymer polyol can be, for example, selected from the group comprising polytetramethylene ether glycol [PTMEG], polyethylene glycol [PEG], also known as polyethylene oxide [PEO], polypropylene ether glycol [PPG], also known as polypropylene oxide [PPO], ester-based polyols, such as ethylene or butylene adipates, copolymers thereof and mixtures thereof.

Examples of polyfunctional aromatic isocyanates include 2,4-toluene diisocyanate, 2,6-toluene diisocyanate, 4,4'-diphenylmethane diisocyanate, dicyclohexylmethane 4,4'-diisocyanate, naphthalene-1,5-diisocyanate, tolidine diisocyanate, para-phenylene diisocyanate, xylylene diisocyanate, mixtures thereof and isomers thereof. The polyfunctional aromatic isocyanate can have less than 20 weight percent aliphatic isocyanates, such as dicyclohexylmethane 4,4'-diisocyanate, isophorone diisocyanate and cyclohexane diisocyanate. The polyfunctional aromatic isocyanate can have less than 15, or less than 12, weight percent aliphatic isocyanates.

If the prepolymer polyol includes PTMEG, a copolymer thereof, or a mixture thereof (e.g. mixture of PTMEG with PPG or PEG), then the isocyanate-terminated reaction product can have a weight percent unreacted NCO range of 4.0 to 30.0, or 6.0 to 10.0, weight percent based on total weight of the prepolymer polyol. Particular examples of PTMEG family polyols are as follows: POLYMEG® 2900, 2000, 1000, 650 from LyondellBasell; PTMEG polyols 220, 650, 1000, 1400, 1800, 2000, and 3000 available from Gantrade; PolyTHF® 650, 1000, 2000 from BASF, and lower molecular weight species such as 1,2-butanediol, 1,3-butanediol, and 1,4-butanediol. If the prepolymer polyol is a PPG/PO, copolymer thereof or a mixture thereof, then the isocyanate-terminated reaction product can have a weight percent unreacted NCO range of 4.0 to 30.0, or 6.0 to 10.0, weight percent. Particular examples of PPG polyols are as follows: Arcol® PPG-425, 725, 1000, 1025, 2000, 2025, 3025 and 4000 from Covestro; Voranol® 1010L, 2000L, and P400 from Dow; Desmophen® 1110BD, Acclaim® Polyol 12200, 8200, 6300, 4200, 2200 both product lines from Covestro. If the prepolymer polyol is an ester, copolymer thereof or a mixture thereof, then the isocyanate-terminated reaction product can have a weight percent unreacted NCO range of 6.5 to 13.0. Particular examples of ester polyols are as follows: Millester 1, 11, 2, 23, 132, 231, 272, 4, 5, 510, 51, 7, 8, 9, 10, 16, 253, from Polyurethane Specialties Company, Inc.; Desmophen® 1700, 1800, 2000, 2001KS, 2001K2, 2500, 2501, 2505, 2601, PE65B from Covestro; Rucoflex S-1021-70, S-1043-46, S-1043-55 from Covestro.

Preferably, the prepolymer reaction product has a 2.0 to 15.0 weight percent, 5 to 13 weight percent, 7 to 11 weight percent or 8 to 10 weight percent unreacted NCO. Examples of suitable prepolymers within this unreacted NCO range include: Imuthane® prepolymers PST-80A, PST-85A, PST-90A, PST-95A, PET-85A, PET-90A, PET-91A, PET-93A, PET-95A, PET-60D, PET-70D, PET-75D, PHP-80A, PHP-85A, PHP-60D, PHP-75D, PHP-80D, PPT-80A, PPT-90A, PPT-95A, PPT-65D, PPT-75D, PCM-95A, PCM-75D, APC-504, APC-722, and API-470 manufactured by COIM USA, Inc. and Adiprene® prepolymers, LFG740D, LF700D, LF750D, LF751D, LF753D, L325, LF600D, LFG963A, and LF950A manufactured by Lanxess. In addition, blends of other prepolymers besides those listed above could be used to reach to appropriate percent unreacted NCO levels as a result of blending. Many of the above-listed prepolymers, such as, LFG740D, LF700D, LF750D, LF751 D, LF753D, LF600D, LFG963A, LF950A, PST-80A, PST-85A, PST-90A, PST-95A, PET-85A, PET-90A, PET-91A, PET-93A, PET-95A, PET-60D, PET-70D, PET-75D, PHP-80A, PUP-85A, PHP-60D, PHP-75D, PHP-80D, PPT-80A, PPT-90A, PPT-95A, PPT-65D, PPT-75D, PCM-95A and PCM-75D are low-free isocyanate prepolymers that have less than 0.1 weight percent free toluene diisocyanate (TDI) monomer and have a more consistent prepolymer molecular weight distribution than conventional prepolymers, and so facilitate forming polishing pads with excellent polishing characteristics. This improved prepolymer molecular weight consistency and low free isocyanate monomer give a more regular polymer structure, and contribute to improved polishing pad consistency. For most prepolymers, the low free isocyanate monomer is preferably below 0.5 weight percent. Furthermore, "conventional" prepolymers that typically have higher levels of reaction (i.e. more than one polyol capped by a diisocyanate on each end) and higher levels of free toluene diisocyanate prepolymer should produce similar results. In addition, low molecular weight polyol additives, such as, diethylene glycol, butanediol and tripropylene glycol facilitate control of the prepolymer reaction product's weight percent unreacted NCO.

As an example, the prepolymer can be reaction product of 4,4'-diphenylmethane diisocyanate (MDI) and polytetramethylene glycol with a diol. Most preferably, the diol is 1,4-butanediol (BDO). Preferably, the prepolymer reaction product has 6 to 13 wt. % unreacted NCO. Examples of suitable polymers with this unreacted NCO range include the following: Imuthane 27-85A, 27-90A, 27-95A, 27-52D, 27-58D from COIM USA and Andur® IE-75AP, IE80AP, IE90AP, IE98AP, IE110AP prepolymers from Anderson Development Company.

The curative blend comprises one or more mono-aromatic amine curatives and one or more polyamine curatives having two or more aromatic rings. The polyamines can be diamines. The mono-aromatic polyamine curative can comprise, for example, one or more alkylthiotoluene diamines (such as dimethylthiotoluenediamine [DMTDA], diethylthiotoluenediamine [DETDA]; monomethylthiotoluenediamine, monoethylthiotoluenediamine, or combinations of two or more thereof), alkylchlorotoluene diamines (such as dimethylchlorotoluenediamine, diethylchlorotoluenediamine, 4-chloro-3,5-diethyltoluene-2,6-diamine), trimethyleneglycol di-p-aminobenzoate; polytetramethyleneoxide di-p-aminobenzoate; polytetramethyleneoxide mono-p-aminobenzoate; polypropyleneoxide di-p-aminobenzoate; polypropyleneoxide mono-p-aminobenzoate, Isobutyl 4-chloro-3,5-diaminobenzoate; 5-tert-butyl-2,4- and 3-tert-butyl-2,6-toluenediamine; 5-tert-amyl-2,4- and 3-tert-amyl-2,6-toluenediamine and chlorotoluenediamine. The polyamine curative having two or more aromatic rings can comprise, for example, one or more of 4,4'-methylene-bis-o-chloroaniline [MOCA], 4,4'-methylene-bis-(3-chloro-2,6-diethylaniline) [MCDEA]; 1,2-bis(2-aminophenylthio)ethane; 4,4'-methylene-bis-aniline; methylene-bis-methylanthranilate [MBNA].

The molar ratio of the polyamine curative having two or more aromatic rings (e.g., MOCA) to the mono-aromatic polyamine curative (e.g., Ethacure™ 300) can be, for example, 20:80 to 80:20, 25:75 to 75:25; 30:70 to 70:30; 35:65 to 65:35; 40:60 to 60:40; 45:55 to 55:45; or about 50:50.

The ratio of pre-polymer to curative can be determined according to stoichiometry. As used herein, "stoichiometry" (Stoich) of a reaction mixture refers to the molar equivalents of (free OH+free $NH_2$ groups) in the curative relative to free NCO groups in the pre-polymer (e.g., 100×(total moles of amine and OH groups in curative blend/total moles of NCO groups in the pre-polymer or prepolymer blend). The stoichiometry can be, for example, in the range of 80% to 120%, preferably 87% to 105%.

After polymerization reaction of the curatives and the isocyanate functional pre-polymers, the resulting polymer comprises a hard phase and a soft phase (or hard segment and soft segment). The hard phase can be orderly and/or randomly arranged and packed to form hard segment domains.

The pre-expanded polymeric microspheres are filled with a fluid, which can be a gas, a liquid or a combination of gas and liquid. If the fluid is a liquid, then the preferred fluid is water, such as distilled water that only contains incidental impurities. For purposes of this application the term microsphere includes shells with less than a perfect spherical shape; for example, these shells have what appears to be a semi-hemispherical shape when cut open and viewed with an SEM. If the fluid is a gas, then air, nitrogen, argon, carbon dioxide or combination thereof is preferred. For some microspheres, the gas may be an organic gas, such as isobutane. Preferably, the fluid is isobutane, isopentane or a combination of isobutane and isopentane. Isobutane trapped in the polymeric microsphere is gas at room temperature (25° C.) and above, depending upon internal pressure in the polymeric shell. Isopentane trapped in the polymeric microsphere is a combination of liquid and gas at room temperature. At temperatures of about 30° C. and above, the isopentane becomes gas depending upon internal pressure in the polymeric shell. A polymeric shell holds the fluid; and typically the polymeric shell holds gas under pressure. Specific examples of the polymer shell include polyacrylonitrile/methacrylonitrile shells and poly(vinylidene dichloride)/polyacrylonitrile, such as poly(acrylonitrile-co-vinylidene chloride-co-methyl methacrylate) shells. Furthermore, these shells may incorporate inorganic particles, such as silicates, calcium-containing or magnesium-containing particles. These particles facilitate separation of the polymeric microspheres. The pre-expanded polymeric microspheres have been expanded before combination with the pre-polymer to a nominal diameter. Typical nominal diameters are in the range of 10 to 60, 15 to 50, or 17 to 45 microns. For example the nominal diameter may be 20 microns or 40 microns. Pre-expanded polymeric microspheres can grow 10 to 60 percent to a final average diameter of 20 to 150 microns. However, the inventors discovered that actual expansion in the polymer matrix formed by reaction of a pre-polymer with a curative can be constrained by the setting of the polymer matrix. For example, using a single curative (either a mono-aromatic amine curative or a poly-aromatic amine curative), the further expansion is constrained or partial pore contraction may occur. However, the inventors discovered that by using a blend of phenyl diamine curative with a poly-aromatic diamine curative the matrix is less constraining of the expansion while avoiding pore collapse or bursting thereby enabling attainment of lower specific gravities.

The pre-expanded polymeric microspheres can be added to the mixture in an amount of from 0.5, from 0.75, from 1, from 1.25, from 1.5. from 1.75, or from 2 weight percent based on weight of pre-polymer, curative and pre-expanded polymeric microspheres. The amount of pre-expanded polymeric microspheres also at the same time can be up to 7, up to 5, up to 4.5, up to 4, up to 3.5, or 3.0 weight percent based on weight of pre-polymer, curative and pre-expanded polymeric microspheres. For convenience, the pre-expanded polymeric microspheres can be pre-blended with the pre-polymer before addition of the curative.

The pre-expanded polymeric microspheres can have a specific gravity of 0.01 to 0.2, 0.02 to 0.15, 0.05 to 0.1, or 0.070 to 0.096 g/cm3. Examples of suitable pre-expanded polymeric microspheres include: Expancel® 551DE40d42, 551 DE20d60, 461DE20d70, 461DE40d60, 461DET80d25, 092DET100d25, 920DE40d30, 920DET40d25, and 920DE80d30 manufactured by Nouryon, and Microsphere® FN-80SDE, F-65DE, F-80DE, FN-100SSDE, and F-190DE, manufactured by Matsumoto Yushi Seiyaku Co., Ltd.

The polishing layer disclosed herein can have a specific gravity of less than or equal to 0.70, or less than or equal to 0.69, or less than or equal to 0.68, or less than or equal to 0.67, or less than or equal to 0.66, or less than or equal to 0.65, or less than or equal to 0.64, or less than or equal to 0.63, or less than or equal to 0.62, or less than or equal to 0.61, or less than or equal to 0.60, or less than or equal to 0.59, or less than or equal to 0.58, or less than or equal to 0.57, or less than or equal to 0.56, or less than or equal to 0.55, or less than or equal to 0.54, or less than or equal to 0.53, or less than or equal to 0.52, or less than or equal to 0.51, or less than or equal to 0.50, or less than or equal to 0.49, or less than or equal to 0.48 gm/cm3. The specific gravity generally can be at least 0.3, at least 0.4, or at least 0.45 g/cm3. Specific gravity as used herein is the weight per volume of a sample and can be determined, for example as set out in ASTM D1622-08 (2008). Such polishing layers can simultaneously have a unimodal pore size distribution.

The size of the pores in the cured polishing layer can range from about 5 microns to about 80 microns with a mean pore size as measured by of at least 23 microns when starting from pre-expanded porous microspheres having a nominal size of 20 microns. When a pre-expanded polymeric microsphere has a nominal size of 40 microns, the mean pore size of the cured polishing layer can be at least 45 microns. The mean pore size can be at least 15%, at least 16%, at least 17%, at least 18%, at least 19%, or at least 20% larger than the nominal size of the pre-expanded polymeric microsphere.

The pre-polymer, the curative blend and the pre-expanded polymeric microspheres can be combined and mixed and then poured into a mold. Reaction will begin upon mixing so it is important to pour the mixture into the mold promptly. After the mold is filled to a suitable height, the mixture in the mold is heated (e.g., in an oven to cure). The height of the mixture in the mold can be at least 2.5 cm, at least 3.5 cm, at least 5 cm, at least 6.5 cm, at least 7.5 cm, at least 9.0 cm, at least 10.0 cm, at least 11.5 cm, at least 12.5 cm, at least 13.0 cm, at least 13.5 cm, at least 14.0 cm, at least 14.5 cm, or at least 15.0 cm and up to a desired height, for example, 30, or 25 or 20 cm. The cure temperature is set for at least the minimum cure temperature for the pre-polymer and curative. The cure temperature can be, for example, about 100 to 120° C., or 102 to 110° C., or 104° C. Cure time can be from 5 to 20, or 10-15 hours. The mold can have a dimension (width and length, or diameter) to provide polishing layers of desired dimensions to provide a cured formulation block or cake. The mold could be larger in width length and diameter such that multiple blocks or cakes can be cut from the cured formulation.

The cured formulation is removed from the mold and the blocks or cakes are sliced from the original thickness (e.g. 5 cm) to the desired thickness of polishing layer (e.g. 0.10 to 0.35, or 0.125 to 0.20 cm). The inventors discovered that this method enables production of multiple polishing layers having uniform pore characteristics from the top to the bottom of the polishing layer and a lower overall specific gravity than when a single polishing layer is formed directly from the mixture. The polishing layers cut from the top and the bottom of the block or cake may not meet desired properties. Thus, if slices are made from the original thickness of the block or cake slab the first 3-5 slices and last 3-5 slices may not show the desired uniformity and low specific gravity. However, ten or more, twelve or more, or fifteen or more, polishing layers having a specific gravity that vary less than ±0.1, less than ±0.05, less than ±0.03, less than ±0.02, or less than less than ±0.01 g/cm$^3$ can be formed from a single block or slab. Those ten (or 12 or 15) or more polishing layers have a specific gravity that is at least 0.04 g/cm$^3$ less than the specific gravity of a polishing layer cut from the top or bottom edge of the same block. A series of polishing layers cut from a center portion of the block can have a specific gravity that is lower than a specific gravity of a polishing layer cut from the edge of a block by at least 5%, at least 6%, at least 7%, at least 8%, at least 9%, at least 10%, and least 11%, at least 12% based on specific gravity at the edge of the block (or at least 10%, least 12%, at least 15%, at least 17%, or at least 20% based on specific gravity at the center of the block). In addition, this method enables attainment of lower specific gravity than can be attained by casting the same formulation directly as individual polishing layers. For example, the specific gravity of the polishing layer can be at least 0.02, at least 0.03, at least 0.04, at least 0.05, at least 0.06, at least 0.07, at least 0.08, at least 0.09, at least 0.10, at least 0.11, at least 0.12 g/cm$^3$ less than the specific gravity of a polishing layer of the same formulation cast as a single polishing layer, rather than being cast as a block and cut from the block.

The pads as disclosed herein show an improvement in metals and oxide removal rate of at least 10% as compared to a similar pad made having with a single aromatic polyamine curative polishing with the same slurry, same prepolymer, same pre-expanded polymeric microspheres, same weight percent of pre-expanded polymeric microspheres, same stoichiometry, same processing conditions, same groove, same configuration, same pad thickness, same specific gravity, same polisher, same conditioning disk, and the polishing recipe. The pads as disclosed herein show an improvement in Tungsten removal rate of at least 10%, at least 15%, at least 20%, at least 25%, at least 30%, at least 35% and at least 40% as compared to a similar pad made having a polishing layer formed with single aromatic polyamine curative polishing with the same slurry. The pads as disclosed herein show an improvement in Copper removal rate of at least 10%, at least 15%, at least 20%, at least 25%, as compared to a similar pad made having a polishing layer formed with a single aromatic polyamine curative polishing with the same slurry. The pads as disclosed herein show an improvement in oxide removal rate of at least 10% and at least 15% as compared to a similar pad having a polishing layer made with a single aromatic polyamine curative polishing with the same slurry.

EXAMPLES

Materials Used

L325 is Adiprene™ prepolymer L325 from Lanxess.

LFG740D is Adiprene™ prepolymer LFG740D from Lanxess.

LF750D is Adiprene™ prepolymer LF750D from Lanxess.

MOCA is 4,4'-methylene-bis-(2-chloroaniline)

Ethacure™ 300 is a mixture of dimethylthiotoulenediamine/monomethylthiotoulenediamine from Albemarle Co.

The pre-expanded polymeric microspheres were pre-expanded poly (acrylonitrile-co-vinylidene chloride-co-methyl methacrylate) microspheres having an average diameter of about 20 μm.

Example 1

A polyisocyanate pre-polymer was blended with pre-expanded polymeric microspheres having a nominal particle diameter of 20 microns to form a pre-blend. The pre-blend was heated to 52° C. to ensure adequate flow of the pre-blend. The curatives were pre-heated (115° C. for MOCA and 46° C. for Ethacure™ 300). The curatives were then mixed with the pre-blend in a high shear mixer and cast directly from the mixer head into a polytetrafluorethylene (PTFE-coated) circular mold 86.36 cm (34") in diameter having a flat bottom over a period of about 2 to 5 minutes to give a total poured thickness of about 6 to 15 cm. The molds were pre-heated to about 107° C. Approximately 15 minutes after completing the casting, the molds were placed in a curing oven. The composition was then heated in the oven using the following cycle: 30 minutes ramp from ambient temperature to a set point of 104° C., then hold for 15.5 hours at 104° C., and then 2 hour ramp from 104° C. to 21° C.

The cured polymer blocks were then removed from the mold and cut using a stationary blade at a temperature of from 70 to 90° C. into approximately thirty-five separate 2.032 mm (80 mil) thick sheets or forty-five separate 1.651 mm (65 mil) thick sheets or fifty-five separate 1.27 mm (50 mil) thick sheets with approximately 7.62 cm (3") thickness of the cured polymer blocks. Cutting was horizontal across the block such that 35, 45 or 55 sheets were cut progressively from the thickness of the block beginning at the top of each block.

Figure 1B:
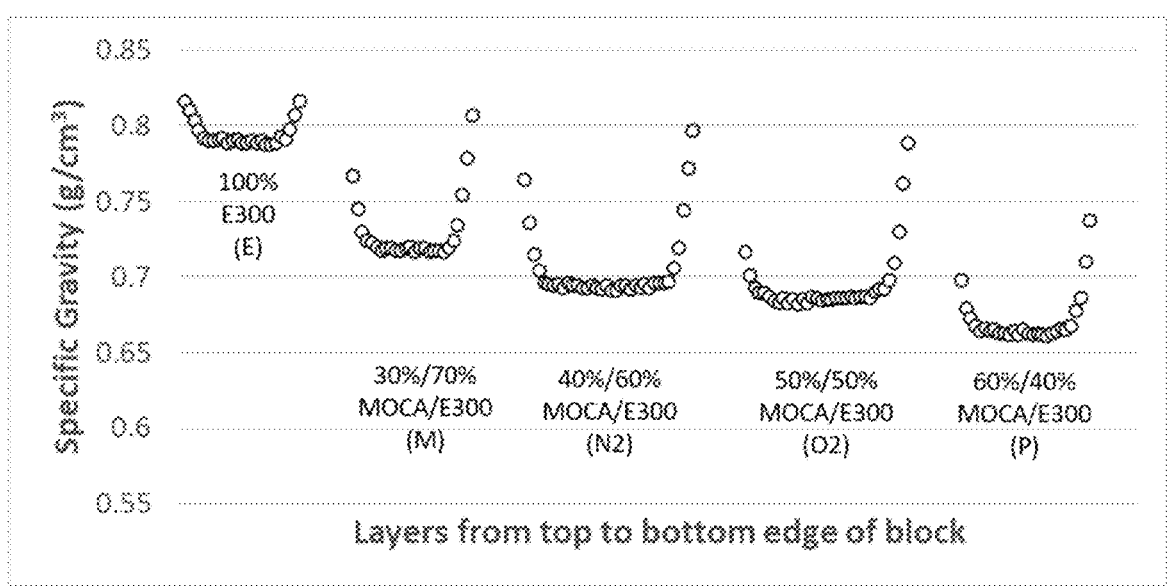

The specific gravity for each cut sheet determined according to ASTM D1622-08 (2008) was measure in the entire sheet, a total weight of the cut sheet divided by a total volume of the cut sheet. Volume of the sheet was determined by measuring the diameter and thickness. Specific gravity data reported were FIG. 1a shows in order the specific gravity data for sheets beginning from the top edge of each block, sheets taken from the middle of the block and the bottom edge of each block for the prepolymer L325 blend with a variety of curatives. (Each dot is a specific gravity for a sheet and the sheets are in order from top edge to bottom edge, corresponding with dots from left to right). FIG. 1b shows the specific gravity data for sheets beginning from the top edge of each block to the bottom edge of each block for a pre-polymer blend of LFG740D and LF750D in 4:1 w/w ratio with a variety of curatives. As can be seen, sheets taken from the top and bottom edges have higher specific gravity than those from the middle and sheets made with the blended curative have lower specific gravity in the middle than sheets made with only a single curative such as MOCA or Ethacure™ 300 curatives.

As a comparison, when MOCA is the only curative the profile of the specific gravity of the skived sheets does not show significant peaks with higher specific gravity at the top and bottom edges.

As a further comparison, when a formulation of pre-polymer with polymeric microspheres and a blend of Ethacure™ 300 and MOCA curative was cast directly as a single polishing layer having a thickness of 2.032 mm (80 mil), that polishing layer had a specific gravity of 0.76 g/cm³, while using the same formulation a specific gravity of 0.70 g/cm³ was obtained when using the method of casting as a block and then cutting.

Example 2

Polishing layers were made substantially as in Example 1 using the formulation as set out in Table 1. The actual specific gravity reported in Table 1 excludes sheets in the peak regions, as shown in FIGS. 1a and 1b, i.e., thin polymer layers or sheets cut from the region near the top edge and bottom edge are excluded. The shear loss modulus, measured as G", was measured by shear dynamic mechanical analysis (DMA), ASTM D5279-08 (2008)). All shear loss modulus values (G") were obtained on an Ares G2 model instrument (by TA instruments) in using samples having a dimension of 36 mm×6.5 mm with a 20 mm gap between clamps. The instrument settings were as follows:

Nitrogen atmosphere

Start temp –100° C. Inherent set point: Off

Soak time: 20.0 s Wait for temperature: On

Ramp rate 3.0° C./min.

Soak time after ramp 0.0 s

Estimated time to complete 1:23:00 h:min:s

Sampling interval 10 s/pt

Strain % 0.2%

Single point

Angular frequency 10 rad/s

Acquisition Mode: Correlation is selected

Delay cycles 0.5

Delay time 3.0 s

Sampling cycles 2 half cycles

Frequency based on correlation: Off Save waveform (point display): Off Save image: Off Iterative Strain Adjustment: Off Use additional harmonics: Off Superimpose steady shear rate: Off Maintain Axial Force during acquisition: On Enabled: Off Enabled: Off Enabled: Off A ratio of G" at 104° C. to G" at 150° C. is reported in Table 1. Calculated specific gravity is determined as set out above. Results are shown in Table 1.

TABLE 1

| Sample | Prepolymer | Wt. % of pre-expanded polymeric microsphere in pre-polymer/microsphere pre-blend | Curative 1 | Curative 2 | Mole ratio of Curative 1:Curative 2 | Stoichiometry (% Amine functionality based on free isocyanate groups in formulation) | $G''_{104°\,C.}/G''_{150°\,C.}$ | Calculated Specific Gravity (g/cm³) | Average Actual Specific Gravity (g/cm³) | Actual Specific gravity as percent of Calculated Specific gravity |
|---|---|---|---|---|---|---|---|---|---|---|
| A | L325 | 3.596% | MOCA | — | — | 105 | 4.38 | 0.81 | 0.80 | 99 |
| B | L325 | 3.595% | MOCA | — | — | 87 | 4.07 | 0.79 | 0.79 | 100 |
| C1 | L325 | 3.817% | — | Ethacure 300 | — | 87 | 4.66 | 0.75 | 0.74 | 99 |
| C2 | L325 | 3.092% | — | Ethacure 300 | — | 87 | 4.49 | 0.80 | 0.80 | 100 |
| D1 | L325 | 3.817% | — | Ethacure 300 | — | 105 | 4.99 | 0.76 | 0.75 | 99 |
| D2 | L325 | 3.092% | — | Ethacure 300 | — | 105 | 3.22 | 0.81 | 0.79 | 98 |
| E | LFG740D and LF750D (4:1) | 3.153% | — | Ethacure 300 | — | 87 | 3.02 | 0.80 | 0.79 | 99 |
| F | L325 | 3.790% | MOCA | Ethacure 300 | 50:50 | 105 | 17.1 | 0.78 | 0.69 | 88 |
| G | L325 | 3.822% | MOCA | Ethacure 300 | 30:70 | 87 | 18.05 | 0.76 | 0.69 | 91 |
| H | L325 | 3.822% | MOCA | Ethacure 300 | 40:60 | 87 | 20.41 | 0.76 | 0.69 | 91 |
| I | L325 | 3.822% | MOCA | Ethacure 300 | 45:55 | 87 | 20.01 | 0.76 | 0.68 | 89 |
| J1 | L325 | 3.790% | MOCA | Ethacure 300 | 50:50 | 87 | 20.44 | 0.77 | 0.68 | 88 |
| J2 | L325 | 3.374% | MOCA | Ethacure 300 | 50:50 | 87 | 16.29 | 0.79 | 0.74 | 94 |
| K | L325 | 3.822% | MOCA | Ethacure 300 | 55:45 | 87 | 19.25 | 0.77 | 0.68 | 88 |
| L | L325 | 3.822% | MOCA | Ethacure 300 | 60:40 | 87 | 15.16 | 0.77 | 0.69 | 90 |
| M | LFG740D and LF750D (4:1) | 3.153% | MOCA | Ethacure 300 | 30:70 | 87 | 9.86 | 0.81 | 0.72 | 89 |
| N1 | LFG740D and LF750D (4:1) | 3.897% | MOCA | Ethacure 300 | 40:60 | 87 | 21.63 | 0.76 | 0.63 | 83 |
| N2 | LFG740D and LF750D (4:1) | 3.150% | MOCA | Ethacure 300 | 40:60 | 87 | 18.86 | 0.81 | 0.69 | 85 |
| O1 | LFG740D and LF750D (4:1) | 3.897% | MOCA | Ethacure 300 | 50:50 | 87 | 21.02 | 0.76 | 0.63 | 83 |
| O2 | LFG740D and LF750D (4:1) | 3.153% | MOCA | Ethacure 300 | 50:50 | 87 | 15.85 | 0.81 | 0.69 | 85 |
| P | LFG740D and LF750D (4:1) | 3.153% | MOCA | Ethacure 300 | 60:40 | 87 | 13.24 | 0.82 | 0.66 | 80 |
| Q | LF750D | 3.902% | MOCA | Ethacure 300 | 40:60 | 87 | 10.98 | 0.76 | 0.69 | 91 |
| R | LF750D | 3.902% | MOCA | Ethacure 300 | 50:50 | 87 | 14.59 | 0.76 | 0.66 | 87 |

Example 3

Polishing layers were made substantially as set forth in Example 1 using LFG740D and LF750D in a 4:1 weight ratio blend as the prepolymer and a blend of MOCA and Ethacure™ 300 as curative (at 2:3 mole ratio and 1:1 mole ratios) and 8700 stoichiometry with varying loadings of pre-expanded polymeric microspheres having a nominal size of 20 microns. The specific gravity was calculated and measured.
Results are shown in Table 2.

TABLE 2

| Sample ID | Mole Ratio of MOCA:Ethacure | Wt. % pre-expanded micro-spheres | Calculated Specific gravity (g/cm³) | Average Actual Specific gravity (g/cm³) | Actual Specific Gravity as % of Calculated Specific Gravity |
|---|---|---|---|---|---|
| 3A | 2:3 | 0.56 | 1.043 | 1.035 | 99 |
| 3B | 2:3 | 1.64 | 0.91 | 0.84 | 92 |
| 3C | 2:3 | 2.61 | 0.81 | 0.69 | 85 |
| 3D | 2:3 | 3.22 | 0.76 | 0.63 | 83 |
| 3E | 1:1 | 0.56 | 1.05 | 1.03 | 98 |
| 3F | 1:1 | 1.63 | 0.91 | 0.83 | 91 |
| 3G | 1:1 | 2.60 | 0.81 | 0.69 | 85 |
| 3H | 1:1 | 3.21 | 0.76 | 0.63 | 83 |

Example 4

Pore size and pore size distribution were examined for certain samples using L325 as the prepolymer. Using a 50/50 mole ratio blend of MOCA/Ethacure™ 300 provided average pore size of 24.5 microns (approximately 22.5% increase over nominal pore size of the pre-expanded polymeric microspheres) while using Ethacure™ alone yielded an average pore size of 22.7 microns (approximately 13.5% increase over nominal pore size of the pre-expanded polymeric microspheres).

Example 5

Figure 2A:
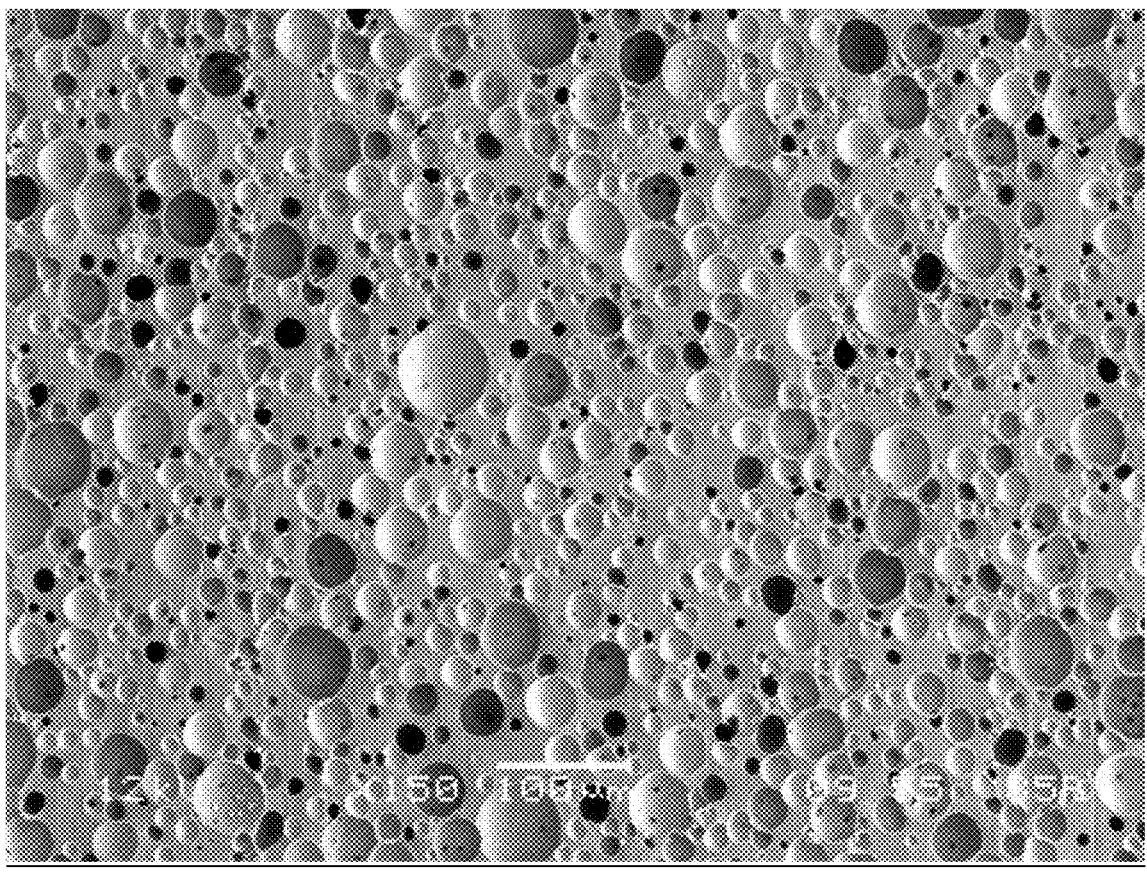
FIGS. 2a and 2b are scanning electron microscopy (SEM) photos of a prior art polishing layer and an exemplary polishing layer as disclosed herein, respectively.
Figure 2B:
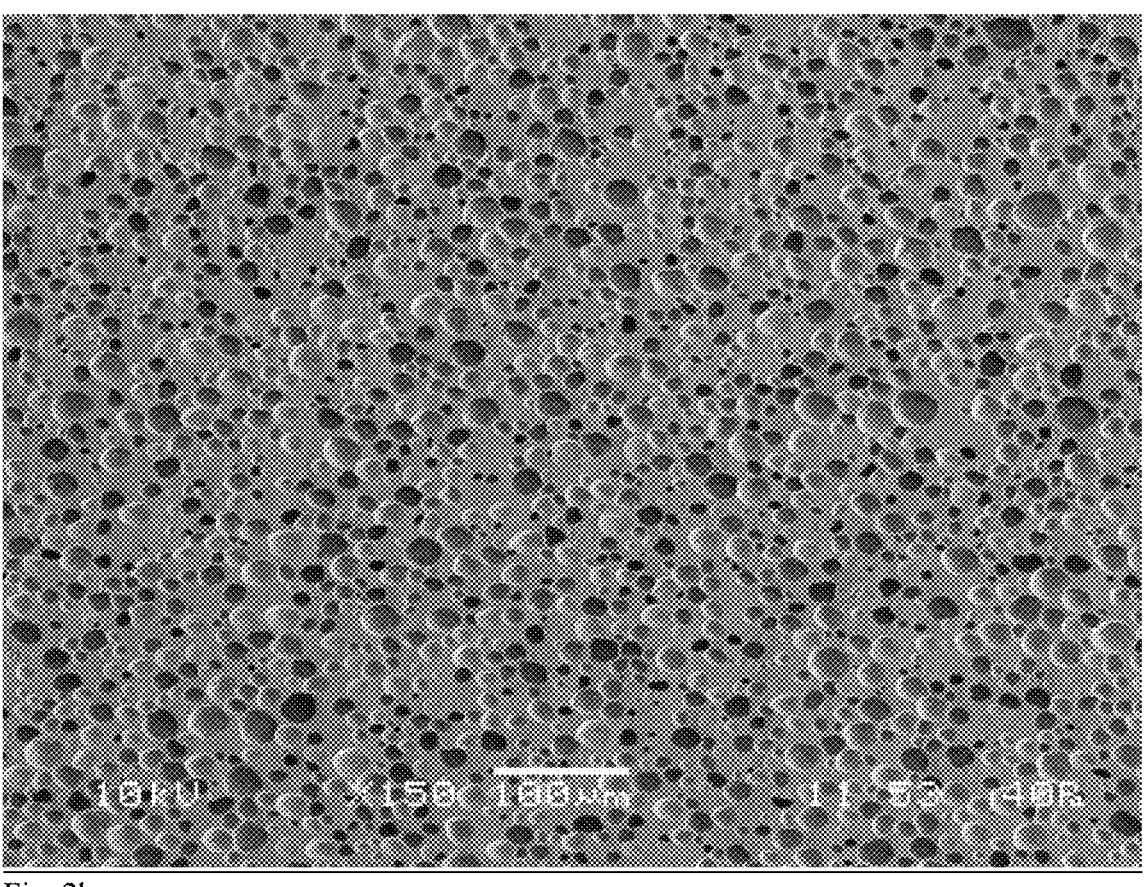

Scanning electron micrographs of a polishing layer made with a combination or pre-expanded and unexpanded microspheres as disclosed in U.S. Pat. No. 9,586,304 is shown in FIG. 2a (prior art). A scanning electron micrograph of an exemplary polishing layer as disclosed here is shown in FIG. 2b.

Example 6

Polishing pads were prepared using a polishing layer on Suba™ IV or SP2310 subpads. The polishing layer for all pad examples were finished with circular (1010) and radial (R32) overlaid grooves (1010+R32), and circular (K7D). The circular 1010 grooves had a width of 0.46 mm (18 mils), depth of 0.76 mm (30 mils) and a pitch of 3.05 mm (120 mils). The R-32 radial grooves were 32 evenly spaced radial grooves with a width of 0.76 mm (30 mils) and a depth of 0.81 mm (32 mils). The circular (K7D) grooves had a width of 0.36 mm (14 mils), depth of 1.02 mm (40 mils) and a pitch of 1.78 mm (70 mils). The circular (K7) grooves had a width of 0.46 mm (18 mils), depth of 0.76 mm (30 mils) and a pitch of 1.78 mm (70 mils).
A comparative pad made as described above with polishing layer formed as described herein from L325 pre-polymer blended with pre-expanded polymeric microspheres and reacted with Ethacure™ 300 polishing Tungsten with a low selectivity slurry showed a Tungsten removal rate of 2285 Angstroms/minute (Å/min). While a pad having a polishing layer made from L325 pre-polymer blended with pre-expanded polymeric microspheres and reacted with a curative that was a 1:1 mole ratio of Ethacure™ 300/MOCA showed a Tungsten removal rate with the same slurry and conditions of 2558 Å/min, an improvement of 12%. The same types of pads showed a 6% improvement in removal rate for the blended curative in copper removal.

A comparative pad made as described above with polishing layer formed as described herein from L325 pre-polymer blended with pre-expanded polymeric microspheres and reacted with MOCA polishing Tungsten with a high selectivity slurry showed a Tungsten removal rate of 2358 Å/min. While a pad having a polishing layer made from L325 pre-polymer blended with pre-expanded polymeric microspheres and reacted with a curative that was a 1:1 mole ratio of Ethacure™ 300/MOCA showed a Tungsten removal rate with the same slurry and conditions of 2635 Å/min and improvement of 12%.

This disclosure further encompasses the following aspects.

Aspect 1: A polishing pad for chemical mechanical polishing comprising:

a polishing layer that comprises a polymer matrix that is the reaction product of an isocyanate terminated oligomer or polymer, with a curative blend comprising a mono-aromatic polyamine curative and a polyamine curative having two or more aromatic rings, wherein the polymer matrix has hard segment domains and soft segment domains wherein pores are present in the polymer matrix, such pores being formed by expansion of pre-expanded fluid filled polymeric microspheres such expansion occurring during reaction of the isocyanate terminated oligomer or polymer with the mono-aryl amine curative and the poly-aryl amine curative, wherein the pores have a unimodal size distribution and wherein the polishing layer has a specific gravity of less than 0.70, preferably less than 0.69, more preferably less than 0.68, yet more preferably less than 0.67, and most preferably less than 0.66 g/cm³.

Aspect 2: The polishing pad of Aspect 1 wherein the soft segment domains are polyurethane soft segments and the hard segment domains are polyurea-polyurethane hard segments.

Aspect 3: The polishing pad of Aspect 1 or 2 wherein the mono-aromatic polyamine curative comprises dimethylthiotoulenediamine, monomethylthiotoulenediamine, or both.

Aspect 4: The polishing pad of any one of the previous Aspects wherein the polyamine curative having two or more aromatic rings comprises 4,4'-methylene-bis-o-chloroaniline, 4,4'-methylene-bis-(3-choro-2,6-diethylaniline) or both.

Aspect 5: The polishing pad of any one of the previous Aspects wherein the isocyanate terminated oligomer or polymer includes a polyether, polyester, polyethylene glycol, polypropylene glycol, polycaprolactone, polycarbonate, or a combination thereof.

Aspect 6: The polishing pad of any one of the previous Aspects wherein the polishing layer is characterized by a ratio of shear loss modulus (G") at 104° C. to shear loss modulus (G") at 150° C. of at least greater than 5:1, preferably greater than 5.5:1, more preferably greater than 6:1, yet more preferably greater than 7:1, and most preferably greater than 8:1.

Aspect 7: The polishing pad any one of the previous Aspects wherein the pores have a mean pore size of at least 23 microns.

Aspect 8: The polishing pad any one of the previous Aspects wherein the pore size is 10% greater than the pore size of pre-expanded fluid filled polymeric microspheres.

Aspect 9: The polishing pad of any one of the previous Aspects wherein the specific gravity of the polishing layer is less than or equal to 95% of a calculated specific gravity for the isocyanate terminated oligomer or polymer, the curative blend and the pre-expanded fluid filled polymeric microspheres.

Aspect 9: The polishing pad of any one of the previous Aspects wherein the mole ratio of the mono aromatic polyamine curative to the polyamine curative having two or more aromatic rings is 15:85 to 85:15, preferably 30:70 to 70:30.

Aspect 10: A method comprising providing a substrate comprising metals, preferably Tungsten, Copper, Ruthenium, or Oxide, more preferably Tungsten and polishing the substrate using the polishing pad of any one of the previous Aspects.

All ranges disclosed herein are inclusive of the endpoints, and the endpoints are independently combinable with each other (e.g., ranges of "up to 25 wt. %, or, more specifically, 5 wt. % to 20 wt. %", is inclusive of the endpoints and all intermediate values of the ranges of "5 wt. % to 25 wt. %," etc.). Moreover, stated upper and lower limits can be combined to form ranges (e.g., "at least 1 or at least 2 weight percent" and "up to 10 or 5 weight percent" can be combined as the ranges "1 to 10 weight percent", or "1 to 5 weight percent" or "2 to 10 weight percent" or "2 to 5 weight percent").

The disclosure may alternately comprise, consist of, or consist essentially of, any appropriate components herein disclosed. The disclosure may additionally, or alternatively, be formulated so as to be devoid, or substantially free, of any components, materials, ingredients, adjuvants or species used in the prior art compositions or that are otherwise not necessary to the achievement of the function and/or objectives of the present disclosure.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

Unless specified to the contrary herein, all test standards are the most recent standard in effect as of the filing date of this application, or, if priority is claimed, the filing date of the earliest priority application in which the test standard appears.

What is claimed is:

1. A polishing pad for chemical mechanical polishing comprising:
a polishing layer that comprises a polyurethane matrix that is the reaction product of an isocyanate terminated oligomer or polymer, with a curative blend comprising a mono-aromatic polyamine curative wherein the mono-aromatic polyamine curative comprises dimethylthiotoulenediamine, monomethylthiotoulenediamine, or both and a polyamine curative having two or more aromatic rings wherein the polyamine curative having two or more aromatic rings comprises 4,4'-methylene-bis-o-chloroaniline, 4,4'-methylene-bis-(3-chloro-2,6-diethylaniline) or both and the molar ratio of the polyamine curative having two or more aromatic rings to the mono-aromatic polyamine curative is 25:75 to 75:25, wherein the polyurethane matrix has polyurea-polyurethane hard segment domains and soft segment domains wherein pores are present in the polyurethane matrix, such pores being formed by expansion of pre-expanded fluid filled polymeric microspheres such expansion occurring during reaction of the isocyanate terminated oligomer or polymer with the mono-aromatic amine curative and the polyamine curative, wherein the pores have a unimodal size distribution and wherein the polishing layer has a specific gravity of less than 0.70 g/cm$^3$.

2. The polishing pad of claim 1 wherein the soft segment domains are polyurethane soft segments.

3. The polishing pad of claim 1 wherein the isocyanate terminated oligomer or polymer is the reaction product of an isocyanate compound and a polyether, polyester, polyethylene glycol, polypropylene glycol, polycaprolactone, polycarbonate, or a combination thereof.

4. The polishing pad of claim 1 wherein the polishing layer is characterized by a ratio of shear loss modulus (G") at 104° C. to shear loss modulus (G") at 150° C. of at least 5.

5. The polishing pad of claim 1 wherein the pores have a mean pore size of at least 23 microns.

6. The polishing pad of claim 1 wherein the specific gravity of the polishing layer is less than or equal to 95% of a calculated specific gravity for the isocyanate terminated oligomer or polymer, the curative blend and the pre-expanded fluid filled polymeric microspheres.

7. The polishing pad of claim 1 wherein the mole ratio of the mono aromatic polyamine curative to the polyamine curative having two or more aromatic rings is 30:70 to 70:30.

8. A method comprising providing a substrate comprising tungsten, and polishing the substrate using the polishing pad of claim 1.

* * * * *